United States Patent

[11] 3,595,084

| [72] | Inventors | Robert N. Bailey;<br>James L. Strom, both of Augusta, Ga. |
|---|---|---|
| [21] | Appl. No. | 14,778 |
| [22] | Filed | Feb. 27, 1970 |
| [45] | Patented | July 27, 1971 |
| [73] | Assignee | Continental Can Company, Inc.<br>New York, N.Y. |

[54] DIGITAL TRANSDUCER SYSTEM
14 Claims, 8 Drawing Figs.

| [52] | U.S. Cl. | 73/398 |
|---|---|---|
| [51] | Int. Cl. | G01l 9/12 |
| [50] | Field of Search | 73/398;<br>317/246; 331/65 |

[56] References Cited
UNITED STATES PATENTS

| 2,368,278 | 1/1945 | Warshaw | 73/398 |
|---|---|---|---|
| 2,594,138 | 4/1952 | Elam | 331/65 X |
| 3,140,450 | 7/1964 | Tavis | 331/65 X |
| 3,308,398 | 3/1967 | Chilton | 331/65 X |
| 3,355,949 | 12/1967 | Elwood et al. | 331/65 X |
| 3,421,106 | 1/1969 | Garber et al. | 331/65 X |
| 3,140,450 | 7/1964 | Tavis | 73/398 X |
| 3,421,106 | 1/1969 | Garber et al. | 73/398 X |

Primary Examiner—Donald O. Woodiel
Attorney—Diller, Brown, Ramik and Holt

ABSTRACT: A digital measuring transducer system is disclosed wherein a pair of oscillators are employed in combination with a mixer to produce an output from the mixer having a pulse repetition frequency equal to the difference in pulse repetition frequencies between the two oscillators and representative of a sensed condition. At least one of the oscillators employs a resonant circuit in the feedback path and a pressure-variable capacitive sensor is connected into the resonant circuit to vary the output frequency of the associated oscillator to produce a difference in frequencies between the two oscillators and a resultant output from the mixer indicative of the pressure condition adjacent the sensor. The second oscillator may be a reference oscillator providing a predetermined reference output frequency or the second oscillator may have a pressure-variable capacitive sensor associated therewith such that the pulse or digital output from the mixer is representative of differential pressure.

INVENTORS
ROBERT N. BAILEY
& JAMES L. STROM

BY
Mason, Porter, Diller & Brown
ATTORNEYS

INVENTORS
ROBERT N. BAILEY
& JAMES L. STROM

BY
Mason, Porter, Diller & Brown
ATTORNEYS

INVENTORS
ROBERT N. BAILEY
& JAMES L. STROM

BY
Mason, Porter, Diller & Brown
ATTORNEYS 3,595,084

DIGITAL TRANSDUCER SYSTEM

This invention relates generally to transducer systems capable of providing a digital output representative of a sensed condition and more particularly to transducer systems employing a pair of oscillators the outputs of which are mixed to provide a pulse output indicative of the sensed condition.

In the past transducer systems have been employed to provide an electrical indication of certain sensed conditions such as pressure conditions in a particular atmosphere, differential pressure, temperature, fluid flow and fluid velocity. Such previously known transducer systems have produced electrical indications of the conditions in question through the provision of electrical signals of variable amplitude or signals employable by various metering devices responsive to the voltage or current characteristics of the output signal. Accordingly, sensors have been employed which directly vary the current or voltage employed in detecting the sensed condition or such sensors have been employed to detune an associated resonant circuit to again effect alterations in voltage and current to indicate alterations in the sensed condition.

Such previously known transducer systems have not, as a rule, been capable of providing a digital output directly representative of the condition being sensed. Such digital output is of significance in that it may be employed directly by a computer through the utilization of known decoding techniques without a further conversion of the output signal of the transducer system. Similarly, many previously employed transducer systems of the type outlined hereinabove have suffered the defect of having an accuracy limited by the full scale setting of the employed indicating device as is commonly the case where voltage or current meters are employed and are calibrated to indicate the condition being monitored. Furthermore, attempts to increase the accuracy of such previously known systems have resulted in the utilization of relatively expensive and/or complex arrangements which, often, are appreciably sensitive to electrical noise and the required information transmission distance.

In accordance with the foregoing, it is a primary object of this invention to provide an improved measuring transducer system capable of employment in indicating a condition which is sought to be monitored.

Additionally, it is an object of this invention to provide a measuring transducer system for producing a digital output directly representative of a sensed condition.

Further, it is an object of this invention to provide a transducer system in accordance with the immediately foregoing object wherein means are provided for producing an output signal having a pulse repetition frequency directly proportional to the condition being sensed.

Still another object of this invention is to provide a measuring transducer system employing first and second oscillators, a sensor connected to at least one of the oscillators for varying the output frequency thereof and a mixer employing the outputs of the two oscillators to produce a condition representative signal corresponding to the differences in frequency between the two oscillators.

Yet another object of this invention is to provide a transducer system of the type referred to immediately hereinabove wherein the sensor is a pressure-variable capacitive sensor connectable into a resonant circuit in the feedback path of the associated oscillator to vary the frequency of that oscillator through variations in the capacitance included in the resonant circuit.

Further still, it is an object of this invention to provide a transducer system employing two oscillators, two condition sensors in cooperation with each of the oscillators, and a mixer for providing an output signal corresponding to differences in frequencies between the two oscillators and indicative of the differences between the conditions sensed by the two sensors.

An additional object of this invention is to provide a transducer system capable of indicating a wide variety of conditions such as commonly effect a pressure change in the area of a sensor, as in the case of variations in detected temperature or fluid flow.

Another object of this invention is to provide a pressure-variable capacitive sensor wherein the capacitive characteristics of the sensor are directly related to the atmospheric pressure in the area of the sensor.

With the above and other objects in view that will hereinafter appear, the nature of the invention will be more clearly understood by reference to the following detailed description, the appended claims, and the several views illustrated in the accompanying drawings.

IN THE DRAWINGS

FIG. 1 is a diagrammatic illustration of a measuring transducer system in accordance with the invention, and shows, in block diagram form, a measuring oscillator in association with a pressure-variable sensor capable of altering the output frequency of that oscillator and a mixer for producing a digital output representative of the frequency difference between the measuring oscillator and a further reference oscillator.

Figure 1:
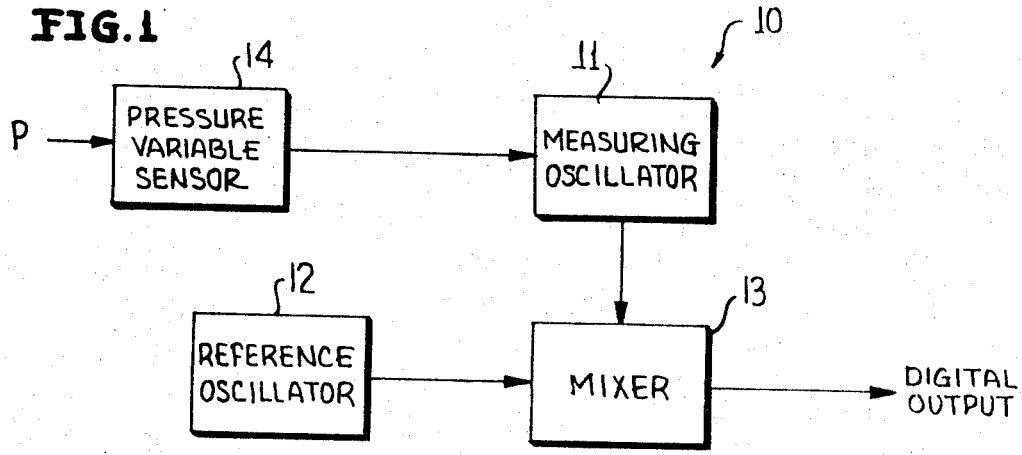

Referring to the drawings in detail, shown generally at 10 is a measuring transducer system including a measuring oscillator 11 suitable for the production of an output at a given frequency. A reference oscillator 12, preferably similar to the measuring oscillator 11 is provided and the reference oscillator 12 provides a similar output of predetermined frequency. The outputs from the oscillators 11 and 12 are applied to a mixer 13 to provide a final pulse-train output having a pulse repetition frequency corresponding to the difference in frequency between the measuring oscillator 11 and the reference oscillator 12. The output frequency of the measuring oscillator 11 is controlled by a pressure variable sensor 14 such that variations in atmospheric pressure in the area adjacent the sensor 14 results in variations in the output frequency from the base output frequency of the measuring oscillator 11. Thus, the oscillators 11 and 12 may be set to provide equal output frequencies at a particular pressure condition in the area of the sensor 14 and, at this pressure condition, the pulse repetition frequency of the output from the mixer 13 is zero. Variations in the pressure condition adjacent the sensor 14 result in an alteration of the output frequency of the measuring oscillator 11 such that the mixer 13 provides a digital output in the form of a pulse-train having a frequency representative of the change in frequency of the measuring oscillator 11 as effected through the alteration in pressure, as sensed by the pressure variable sensor 14.

Figure 6:
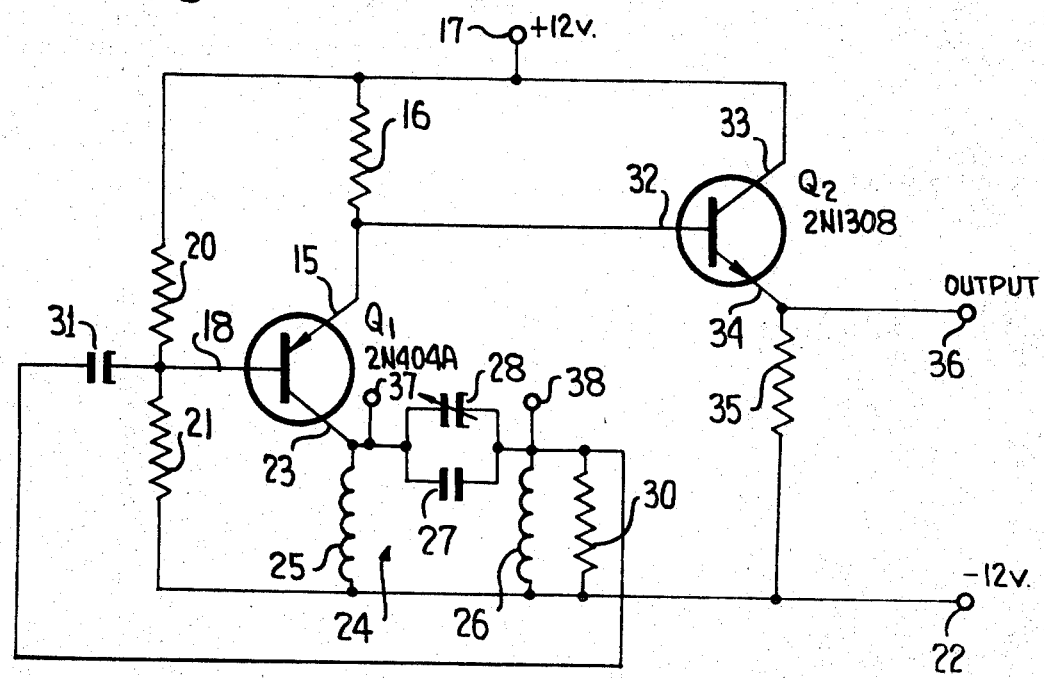
FIG. 6 is a schematic illustration of an oscillator suitable for employment in this invention, and shows a frequency determining resonant circuit in the feedback path of the oscillator.

A suitable, inexpensive oscillator employable as both the measuring oscillator 11 and the reference oscillator 12 is shown in FIG. 6 wherein there is employed a PNP transistor $Q_1$ having an emitter 15 positively biased through a resistor 16 which is connected to a first bias terminal 17 for connection to a suitably chosen bias voltage source (not shown) and a base 18 connected intermediate a pair of resistors 20 and 21 which are series connected between the first bias terminal 17 and a further bias terminal 22 suitable for connection to the negative side of the DC bias voltage source (not shown). The transistor collector 23 is connected into a tank circuit generally indicated at 24 and including a pair of inductors 25, 26 between which is connected in parallel a capacitor 27 and a variable capacitor 28. The tank circuit 24 determines the feedback signal developed across the resistor 30 and fed from the transistor collector 23 to the transistor base 18 via a blocking capacitor 31.

The tuned tank circuit 24 determines the output frequency of the oscillatory signal developed at the emitter 15 of the transistor $Q_1$ and this oscillatory signal is applied to an output transistor $Q_2$ via the base 32 thereof. The output transistor $Q_2$ is of NPN configuration having a collector 33 positively biased from the first bias terminal 17, and having an emitter 34 negatively biased through a resistor 35 connected to the second bias terminal 22. The final oscillatory output of the oscillator is developed across the output terminal 36 and the second bias terminal 22 and, again, the final oscillatory output signal is of a frequency determined by the tuned tank circuit or resonant circuit 24. The output resistor 35 is, of course, suitably chosen for utilization with the mixer 13 to which the final output signal is fed.

Figure 3:
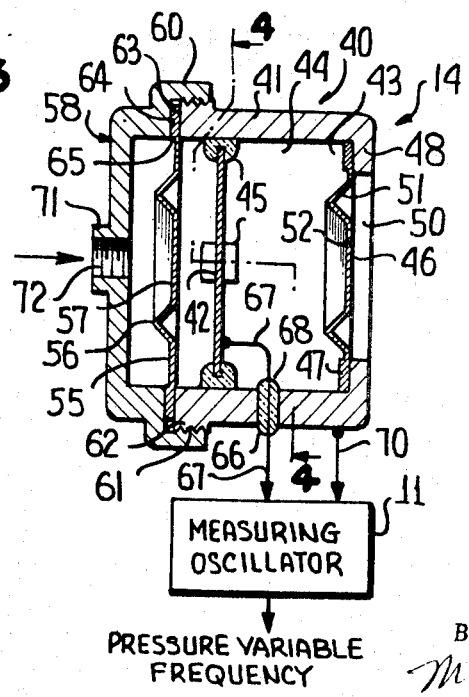
FIG. 3 is a sectional view of a pressure-variable capacitive sensor in association with a diagrammatically illustrated measuring oscillator, and shows a sensor in accordance with this invention and employing a fixed capacitor plate in spaced relation to a flexible metallic diaphragm constituting a second, movable capacitor plate.
Figure 4:
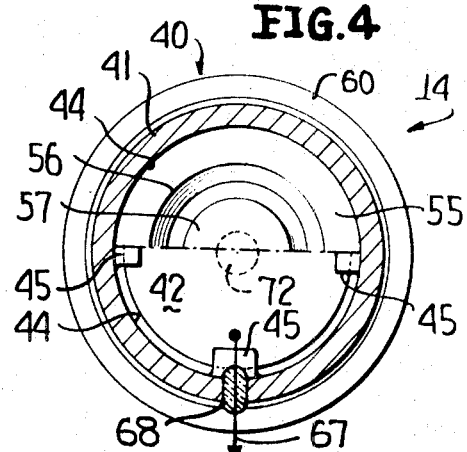
FIG. 4 is a sectional view of the sensor of FIG. 3, taken along the line 4—4 of FIG. 3, and further illustrates the relationship of the fixed plate to the flexible diaphragm.

As indicated hereinabove, the oscillator illustrated in FIG. 6 is suitable for employment as either of the measuring oscillator 11 and reference oscillator 12. When the oscillator illustrated in FIG. 6 is employed as the measuring oscillator 11 in the embodiment shown in FIG. 1, a pair of terminals 37, 38 are provided in parallel with the parallel capacitors 27 and 28 of the tuned, resonant circuit 24. The pressure-variable capacitive sensor 14, best seen in FIG. 3, is connected to the terminals 37 and 38 in parallel with both the fixed capacitor 27 and the variable capacitor 28. The pressure-variable capacitive sensor 14 includes a tubularly configured housing 40 which may be cylindrical in section, as shown, or configured in accordance with particular mounting requirements. Fixedly mounted within a main housing body 41 of the housing 40 is a first plate 42 having a surface area approaching the cross-sectional area of a cavity 43 as defined by the internal surface 44 of the main housing body 41. The fixed metallic plate 42 is adjoined to the internal surface 44 of the main housing body 41 through the employment of a number of insulative or glass beads 45 extending between the outer extremity of the fixed plate 42 and the inside diameter 44 at spaced points about the periphery of the plate 42. The mounting beads 45 maintain the plate 42 in insulatively spaced relationship with the internal surface 44 of the main housing body 41 while allowing fluid communication between portions of the cavity 43 lying on opposite sides of the plate 42.

The cavity 43 is terminated at one end thereof by a flexible metallic diaphragm 46 which includes a peripheral mounting portion 47 fixedly attached to a radially inwardly extending flange portion 48 of the main housing body 41. The radially inwardly directed flange 48 defines an aperture 50 adjacent a central portion of the diaphragm 46. The central portion of the diaphragm 46 is relatively thin and includes one or more circular corrugations 51 encompassing a planar panel portion 52. The one or more corrugations 51 allow flexure of the diaphragm 46 in that portion of the diaphragm located immediately adjacent the aperture 50.

The cavity 43 within the main housing body 41 is enclosed at the end of the main housing body 41 opposite the aperture 50 by a second relatively thin flexible metallic diaphragm 55 which extends fully across and completely closes the cavity 43. The diaphragm 55 is, like the diaphragm 46, provided with one or more corrugations 56 encircling a central panel portion 57. The metallic diaphragm 55 defines a second capacitor plate adjacent the fixed plate 42 and the metallic diaphragm 55 is in conductive engagement with the main housing body 41. The diaphragm 55 may be mounted to the main housing body 41 by suitable mounting provisions. As shown, a cap 58 is provided with an outwardly extending female mounting portion 60 which is internally threaded as at 61 for engagement with a threaded end portion 62 of the main housing body 41. The housing body 41 and the cap 58 define adjacent mounting surfaces 63, 64, respectively, to maintain a peripheral mounting portion 65 of the diaphragm 55 captive between such surfaces.

Connection of the pressure-variable capacitive sensor 14 to the terminals 37, 38 provided in the oscillator 11, as shown in FIG. 6, is facilitated through the utilization of a lead-through 66 including a lead 67 electrically connected to the fixed plate 42 and extending through an insulator 68 of glass or other insulative material. The metallic housing 40 of the sensor 14 serves as a further terminal and a further lead 70 is conductively connected thereto. The leads 67 and 70 are, then, connected across the capacitors 27, 28 of the oscillator shown in FIG. 6 to provide the sensor-oscillator connector diagrammatically illustrated in FIG. 1.

The cavity 43 defined within the pressure-variable capacitive sensor 14 is preferably filled with silicone fluid or other fluid of suitable high dielectric quality and insensitivity to temperature variation. The fixed plate 42 and the flexible metallic diaphragm 55 define a spaced-plate capacitor whose capacitance varies in response to the variations in pressure adjacent the diaphragm 55 on the side opposite thereof from the cavity 43. The outer face of the diaphragm 55 may be placed in direct contact with an atmosphere, the pressure of which is to be monitored, or, as shown, the cap 58 may be provided with a pressure line connection 71 having a central aperture 72 which may be threaded for connection to a pressure line to be employed in communication with the particular atmosphere under test. It will, of course, be apparent that the sensor 14 is particularly suitable for measurement of temperature variations and variations in fluid flow. That is, temperature variations may be monitored through the utilization of pressure variations adjacent the flexible diaphragm 55 such as result from the characteristic temperature coefficient of expansion of a body of fluid placed in thermal proximity to such temperature variations and in communication with the outwardly facing surface of the diaphragm 55. Similarly, pressure variations resultant from variations in fluid flow may be applied to the sensor 14 to indicate fluid velocity at a particular test area in a fluid system.

It will be noted that the flexible diaphragm 55 and the fixed plate 42 are located relatively proximate to each other and, preferably, the diaphragm 55 is of sufficient flexibility to cause the capacitance of the sensor 14 to vary directly with the pressure applied thereto. Similarly, the diaphragm 46 is sufficiently flexible, under the influence of the fluid provided within the cavity 43, to allow relatively free flexure of the diaphragm 55.

In operation, the measuring oscillator 11 is set to a predetermined base frequency via the selection of the capacitor 27 and the setting of the variable capacitor 28. Variations in the output pulse repetition frequency, effected through variations in the spacing between the diaphragm 55 and the fixed plate 42, preferably represent a frequency range which is significantly small with respect to the base frequency determined by the capacitors 27 and 28. Thus, alterations in output frequency from the measuring oscillator 11 may vary in substantially a one-to-one relationship. That is, utilization of a relatively high base frequency for the measuring oscillator 11 allows frequency variations at a relatively linear rate and the employing of a relatively flexible diaphragm 55 allows the capacitance of the sensor 14 to vary substantially directly with the pressure applied to the exterior face of the diaphragm 55 to effect a relatively linear decrease in output frequency from the measuring oscillator 11.

The reference oscillator 12 which is connected with the mixer 13 as shown in FIG. 1 may be essentially identical to the oscillator 11, thus corresponding to the schematic illustration of FIG. 6 absent the connection of a pressure-variable capacitive sensor across the parallel capacitors 27 and 28. The reference oscillator 12, then, may exhibit a base output frequency identical to the base frequency of the measuring oscillator 11 to provide a mixer output directly proportional to the variations in pressure applied to the diaphragm 55. It will, of course, be apparent that the base frequency of the measuring oscillator 11 may correspond to any particular sensed pressure, temperature or fluid flow condition such that only variations from that condition result in a pulse output from the mixer 13.

Figure 7:
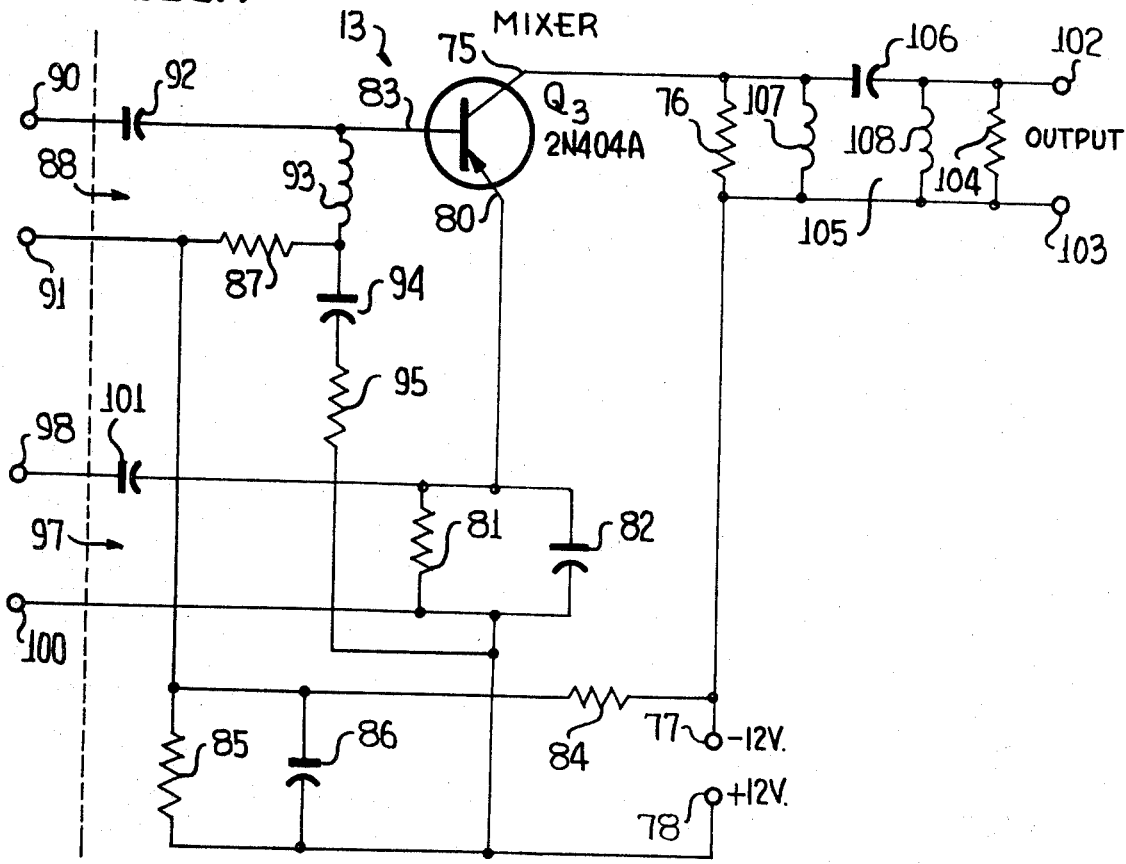
FIG. 7 is a schematic illustration of a mixer employable in this invention, and shows a circuit arrangement suitable for providing an output having a pulse repetition frequency equal to the difference in frequencies of the inputs applied thereto.

The mixer 13 may be of relatively simple configuration as shown in FIG. 7 wherein a PNP transistor $Q_3$ includes a collector 75 negatively biased through a resistor 76 connected to a first bias terminal 77 to which is applied a suitable bias source (not shown). A second bias terminal 78 is connected with the transistor emitter 80 through a bias resistor 81 and a bypass capacitor 82. Biasing of the transistor base 83 is provided by a resistor 84 connected to the first bias terminal 77 and a further resistor 85 and an associated bypass capacitor 86 connected to the second bias terminal 78 to provide proper base biasing through an input resistor 87.

A first input channel 88 including a pair of input terminals 90 and 91, a capacitor 92, an inductor 93 and the input resistor 87 is coupled to the output of the measuring oscillator 11 through the utilization of any of a number of suitable coupling provisions interposed between the output terminals 36 and 22 of the measuring oscillator and the input terminals 90 and 91 of the mixer 13. The capacitor 92 and the inductor 93 provide frequency discrimination in the output frequency range of the measuring oscillator 11 to establish a base input signal across the inductor 93 which is connected at one end thereof to the base 83 of the transistor $Q_3$ and at the other end thereof to the positive side of the bias source through a capacitor 94 of relatively high capacitance and a resistor 95 of relatively low resistance.

A second input channel 97 includes a pair of input terminals 98 and 100. The input channel 97 is coupled to the output of the reference oscillator 12 through the utilization of suitably selected coupling means interposed between the output terminals of the reference oscillator 12 corresponding to the output terminals 36, 22 shown in FIG. 2 and the input terminals 98, 100. Thus a reference frequency is provided to the emitter 80 of the transistor $Q_3$ through the coupling thereof to the input channel 97 through a capacitor 101.

The output signal from the mixer 13 is provided from the collector 75 of the transistor $Q_3$ to a pair of output terminals 102, 103 across which is provided an output resistor 104 which, in turn, is coupled to the collector 75 via a filter section 105 including the capacitor 106 and the two parallel inductors 107 and 108.

The output from the mixer 13 shown in FIG. 7 is of pulse-train configuration having a pulse repetition frequency directly proportional to the difference in the input frequencies applied to the two input channels 88 and 97 and, thus, the pulse-train output from the mixer 13 varies in accordance with the variations in pressure adjacent the diaphragm 55 of the pressure-variable capacitive sensor shown in FIG. 3 when that sensor is employed in the overall system illustrated in FIG. 1.

Figure 2:
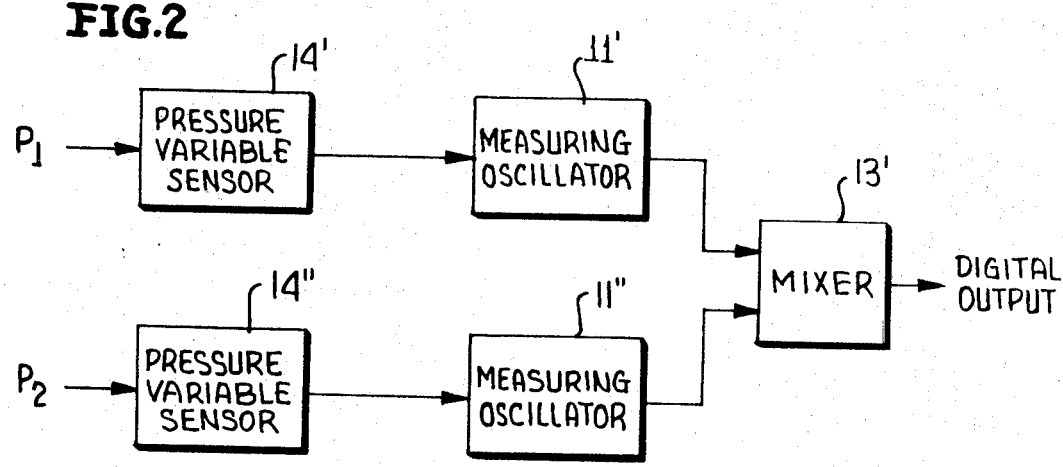
FIG. 2 is a diagrammatic illustration of a further transducer system in accordance with this invention, and shows, again in block diagram form, the utilization of two measuring oscillators in association with two condition sensors to provide a digital output from the mixer representative of differences in the condition sensed by the two sensors.

In the embodiment illustrated in FIG. 2 a first pressure-variable capacitive sensor 14' and an associated measuring oscillator 11' supply an input of a first frequency to a first channel of a mixer 13' while a second pressure-variable sensor 14" and an associated measuring oscillator 11" supply the second input to the second channel of the mixer 13'. The pressure-variable sensors 14', 14", the measuring oscillators 11', 11" and the mixer 13' of the embodiment illustrated in FIG. 2 may correspond fully to the corresponding components of the embodiment illustrated in FIG. 1 as described hereinabove. Similarly, the measuring oscillators 11' and 11" may be provided in accordance with the foregoing discussion relative to the oscillator illustrated in FIG. 6 and the mixer 13' may be provided in accordance with the discussion hereinabove with respect to the mixer shown in FIG. 7. The digital output or pulse-train from the mixer 13' illustrated in FIG. 2 is directly representative of differential pressure as sensed by both of the pressure-variable capacitive sensors 14' and 14". Thus, alterations in the pressure $P_1$ sensed by the sensor 14' may be employed to vary the frequency of the output from the measuring oscillator 11' and, similarly, the pressure $P_2$ will be employed to determine the frequency of the output from the measuring oscillator 11". Thus, the output of the mixer 13' will have a frequency equal to the difference in frequency between the two oscillators 11' and 11" indicative of the difference between pressure $P_1$ and pressure $P_2$.

Figure 5:
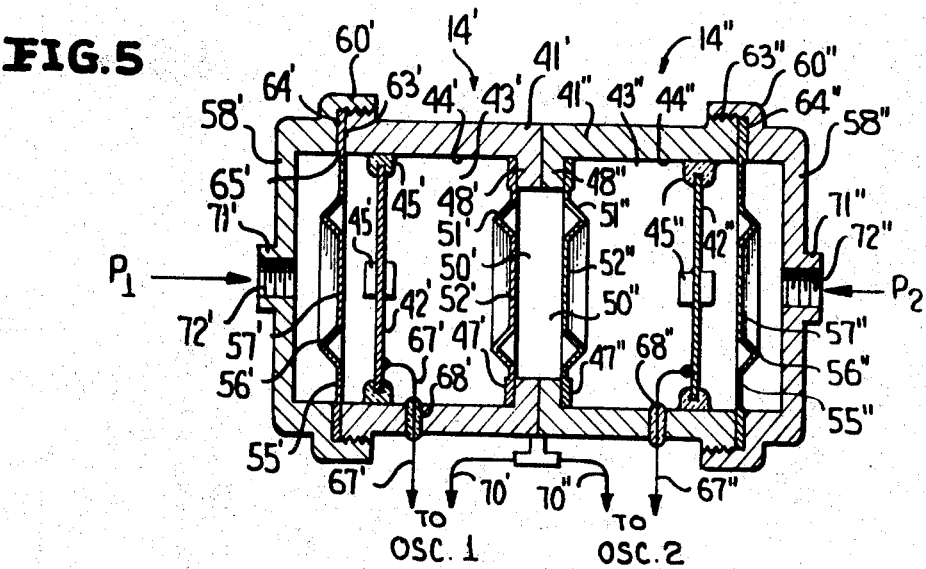
FIG. 5 is a sectional view of a pair of sensors of the type illustrated in FIG. 3, and shows such sensors arranged in back-to-back relationship for utilization in the system illustrated in FIG. 2 to provide a differential pressure indication.

A combined pressure-variable capacitive sensor suitable for employment in the embodiment shown in FIG. 2 is illustrated in FIG. 5. The combined sensor of FIG. 5 corresponds to a pair of sensors similar to the sensor shown in FIG. 3 (the elements in FIGS. 5 and 3 being similarly referenced) and arranged in back-to-back relationship, joined together at the inwardly directed flange portions 48' and 48". First and second pressures $P_1$, $P_2$ are supplied to the joined sensors 14', 14" adjacent the respective diaphragms 55', 55". Variations in the capacitances exhibited by the two sensors 14' and 14" will result from pressure variations in the pressures $P_1$ and $P_2$ as set forth hereinabove with respect to the sensor 14 shown in FIG. 3. The resulting variations in capacitance are applied to the measuring oscillators 11' and 11" through connection of the leads 67' and 70', and 67" and 70" into the frequency determining tuned circuits of each of the measuring oscillators 11' and 11". Once again, the combined sensor shown in FIG. 5 may be employed to provide a direct digital output indicative of different temperature or differential fluid flow velocity.

Figure 8:
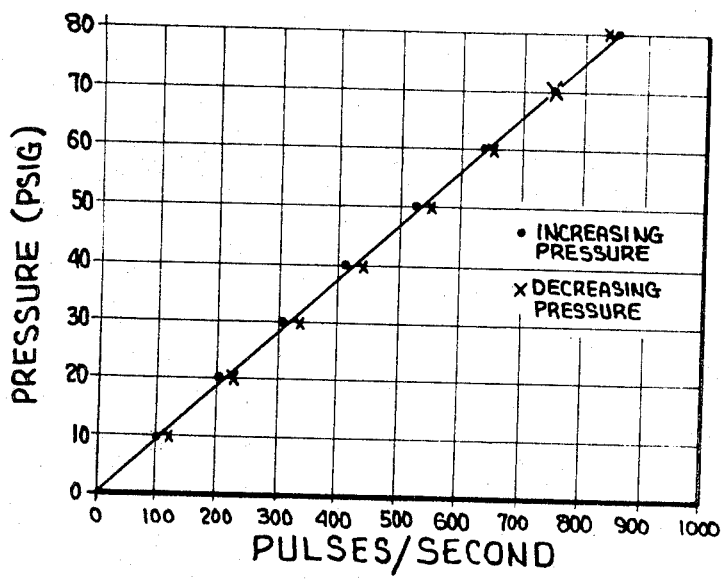
FIG. 8 is a graphical illustration of the relationship of output pulse repetition frequency to the actual pressure being monitored through the utilization of this invention, and shows a substantially directly proportional relationship between the output signal and the sensed condition.

While it will be apparent to one skilled in the art that wide variations in the oscillator and mixer circuitry shown in FIGS. 6 and 7, respectively, may successfully be employed, a pulse or digital output from the mixer 13, substantially directly proportional to pressure changes and graphically represented in FIG. 8 has been obtained through a utilization of the arrangement shown in FIG. 1, employing the pressure-variable capacitive sensor 14 shown in FIG. 3, oscillators 11 and 12 constructed in accordance with FIG. 6 and a mixer 13 constructed in accordance with FIG. 7. In the aforementioned operative embodiment, the pulse output pressure indication was accurate to ±1 percent through the employment of the following circuit components:

OSCILLATORS 11 AND 12

| | |
|---|---|
| Bias Source (not shown) | 12v. |
| Transistor $Q_1$ | 2N404A |
| Resistor 16 | 1.2K ohms |
| Resistor 20 | 27K ohms |
| Resistor 21 | 22K ohms |
| Inductor 25 | 5mh. |
| Inductor 26 | 5mh. |
| Capacitor 27 | 69 $\mu\mu f$. |
| Resistor 30 | 1.8K ohms |
| Capacitor 31 | 0.05 $\mu f$. |
| Transistor $Q_2$ | 2N1308 |
| Resistor 35 | 1.8K ohms |

MIXER 13

| | |
|---|---|
| Bias Source (not shown) | 12v |
| Transistor Q₃ | 2N404A |
| Resistor 76 | 1.8K ohms |
| Resistor 81 | 1.8K ohms |
| Capacitor 82 | 0.1 μf |
| Resistor 84 | 25K ohms |
| Resistor 85 | 2.5K ohms |
| Capacitor 86 | 0.1 μf |
| Resistor 87 | 1.8K ohms |
| Capacitor 92 | 0.1 μf |
| Inductor 93 | 100 μh. |
| Capacitor 94 | 10 μf |
| Resistor 95 | 1 ohm |
| Capacitor 101 | 0.1 μf. |
| Resistor 104 | 1.8K ohms |
| Capacitor 106 | 3 μμf. |
| Inductor 107 | 10 μh. |
| Inductor 108 | 10 μh. |

While the structures and circuit arrangements shown and described hereinabove represent preferred forms of the invention, it will be readily apparent to one skilled in the art that variations may be made in such structures and circuit arrangements without departure from the scope and spirit of the invention as defined by the appended claims.

We claim:

1. A measuring transducer system for producing a digital output directly representative of a measured condition comprising a first oscillator for producing an oscillatory output signal at a first frequency, a second oscillator for producing an oscillatory output signal at substantially said first frequency, mixer means responsive to the output of said first and second oscillators for directly producing a pulse output at a repetition rate substantially equal to the difference in frequencies between said first and second oscillators, and pressure actuable condition sensing means for altering the oscillatory output signal frequency of at least one of said oscillators from said first frequency to alter the repetition rate of said pulse output from said mixer means from zero to a repetition rate representative of the difference in output frequencies of said first oscillator and said second oscillator whereby a digital output suitable for feeding digital-signal operated apparatuses is obtained directly from the mixer means, and wherein said mixer means comprises an electron discharge device having an output means connected between an output electrode and a common electrode of said device, the output from said first oscillator being coupled between said common electrode and a point of reference potential, and the output from said second oscillator being coupled between an input electrode of said electron discharge device and one end of a series connected resistor and capacitor circuit, the other end of the last said circuit being connected to said point of reference potential.

2. The system according to claim 1 including a filter means coupled to said mixer means for receiving the pulse output thereof, and output means coupled to said filter means for receiving pulses passed by said filter means.

3. The system according to claim 2 wherein said filter means comprises a π filter.

4. The system according to claim 3 wherein said π filter comprises a series connected capacitor connected between one end of each of two inductors, the other end of each of the inductors being connected to a common point.

5. The system according to claim 1 wherein the output of the first oscillator is coupled across a parallel connected resistor and capacitor, the parallel connected resistor and capacitor being connected between said common electrode and said point of reference potential, and the output of said second oscillator is coupled across an inductor, the last said inductor having one end thereof connected to said input electrode, the other end of the last said inductor being connected to said one end of the series connected resistor and capacitor circuit.

6. The system according to claim 1 wherein said first oscillator has a fixed frequency and said sensing means provides changes in the output frequency of said second oscillator substantially linearly with changes in said sensed condition to cause said mixer means to provide an output pulse signal the repetition rate of which varies from zero in substantially direct proportion to changes in said sensed condition.

7. The system according to claim 6 wherein said second oscillator includes frequency determining tuned circuit means, said sensing means comprising pressure variable capacitor means electrically connected into said tuned circuit means for decreasing the frequency into said second oscillator in response to increases in the capacitance of said pressure variable capacitance means.

8. The system according to claim 1 wherein said sensing means provides changes in output frequency from said first oscillator in a given direction substantially linearly with changes in said sensed condition, said system further comprising second pressure actuable condition sensing means for altering the output frequency of said second oscillator from said first frequency in a direction opposite to said given direction, said mixer means being responsive to the output frequencies of said first and second oscillators for providing a pulse output having a pulse repetition rate representative of the difference in the conditions sensed by the first-mentioned pressure actuable condition sensing means and said second pressure actuable condition sensing means.

9. The system according to claim 8 wherein said first and second oscillators include frequency determining tuned circuit means, both said condition sensing means comprising pressure variable capacitor means electrically connected into said tuned circuit means for decreasing the frequency of said first and second oscillators in response to increases in the capacitances of the associated pressure variable capacitor means.

10. The system according to claim 1 wherein said second oscillator is a reference oscillator for providing a predetermined reference output frequency, said first oscillator having a base output frequency substantially equal to said reference output frequency and variable from said base output frequency in response to variations in the condition sensed by said sensor means.

11. The system according to claim 10 wherein said first oscillator comprises at least one active element and tuned circuit means for determining the output frequency of said first oscillator, said pressure sensitive means comprising variable capacitance means electrically connected into a feedback circuit means of said first oscillator for varying the capacitance in said tuned circuit means in response to said variations in pressure.

12. The system according to claim 10 further comprising second pressure sensitive sensor means electrically connected to said second oscillator for establishing the output frequency of said second oscillator in response to a second sensed pressure condition.

13. The system according to claim 12 wherein said sensor means electrically connected to said first oscillator and said second sensor means comprise first and second pressure sensitive capacitive means, respectively, for varying the output of said first and second oscillators.

14. The system according to claim 1 wherein said pressure sensitive means is a capacitive sensor means comprises a pair of spaced capacitor plates, at least one of said plates being movable in response to variations in pressure thereon to alter spacing of said plates and to alter the capacitance of said sensor means.